US012636983B2

(12) United States Patent
Schergun et al.

(10) Patent No.: US 12,636,983 B2
(45) Date of Patent: May 26, 2026

(54) CHILD HOLDING DEVICE, MORE PARTICULARLY STROLLER

(71) Applicant: CYBEX GmbH, Bayreuth (DE)

(72) Inventors: Andreas Schergun, Bayreuth (DE); Ralf Holleis, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 287 days.

(21) Appl. No.: 18/546,404

(22) PCT Filed: Feb. 15, 2022

(86) PCT No.: PCT/EP2022/053594

§ 371 (c)(1),
(2) Date: Aug. 14, 2023

(87) PCT Pub. No.: WO2022/171885

PCT Pub. Date: Aug. 18, 2022

(65) Prior Publication Data

US 2024/0131968 A1    Apr. 25, 2024
US 2024/0227638 A9    Jul. 11, 2024

(30) Foreign Application Priority Data

Feb. 15, 2021    (DE) .................... 20 2021 100 742.7

(51) Int. Cl.
*B60N 2/28*        (2006.01)
*A47D 13/02*       (2006.01)

(52) U.S. Cl.
CPC ........... *B60N 2/2848* (2013.01); *A47D 13/02* (2013.01)

(58) Field of Classification Search
CPC ..... B60N 2/2848; B60N 2/2887; A47D 13/02
See application file for complete search history.

(56) References Cited

U.S. PATENT DOCUMENTS 6,715,828 B1 *    4/2004    Cheng .................. B60N 2/2845
                                                        297/256.16
10,279,832 B2    5/2019    Fleming et al.
2006/0071450 A1    4/2006    Wu
(Continued)

FOREIGN PATENT DOCUMENTS

CN          203186387 U      9/2013
DE           19708395 A1 *  10/1997 ............... B60N 2/28
DE      202011102143 U1      8/2011
(Continued)

OTHER PUBLICATIONS

"International Application No. PCT/EP2022/053594, International Search and Written Opinion mailed May 4, 2022", (May 4, 2022), 13 pgs.

*Primary Examiner* — Milton Nelson, Jr.

(74) *Attorney, Agent, or Firm* — Schwegman Lundberg & Woessner, P.A.

(57) ABSTRACT

Described is a child holding device, more particularly a stroller and/or child seat, comprising a setting device for setting a state of the child holding device, a locking mechanism comprising a first locking device and at least one second locking device for locking the state, and a manual, actuation device for actuating the first locking device and the at least one second locking device, wherein the actuation device is connected by a common force transmission device to the first locking device and the at least one second locking device.

17 Claims, 2 Drawing Sheets

(56)            References Cited

U.S. PATENT DOCUMENTS

Figure 1:
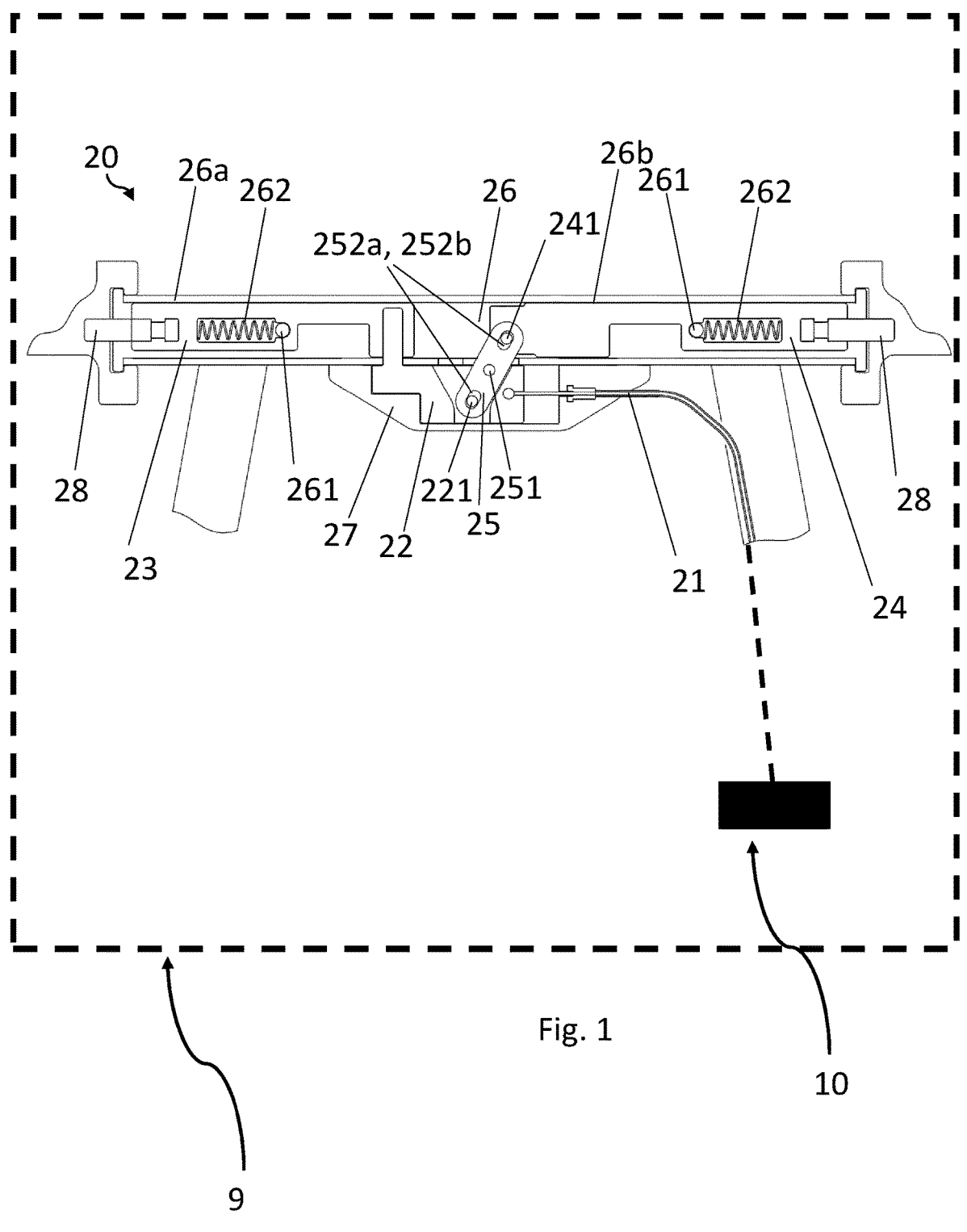

| 2014/0167393 | A1 | 6/2014 | Tsai et al. |
| 2018/0265114 | A1 | 9/2018 | Lelaure et al. |

FOREIGN PATENT DOCUMENTS

| DE | 202019103251 | U1 | 6/2019 |
| EP | 2684764 | A2 | 1/2014 |
| FR | 2810954 | A1 | 1/2002 |
| JP | 2007076538 | A | 3/2007 |
| KR | 102000636 | B1 | 7/2019 |
| WO | WO-2022171885 | A1 | 8/2022 |

* cited by examiner

CHILD HOLDING DEVICE, MORE PARTICULARLY STROLLER

PRIORITY CLAIM TO RELATED APPLICATIONS

This application is a U.S. national stage filing under 35 U.S.C. § 371 from International Application No. PCT/EP2022/053594, filed on 15 Feb. 2022, and published as WO2022/171885 on 18 Aug. 2022, which claims the benefit under 35 U.S.C. 119 to German Application No. 20 2021 100 742.7, filed on 15 Feb. 2021, the benefit of priority of each of which is claimed herein, and which applications and publication are hereby incorporated herein by reference in their entirety.

The invention relates to a child holding device, in particular a stroller and/or child seat, comprising an adjusting device for adjusting a state of the child holding device and a locking mechanism comprising a first and at least one second locking device for locking the state.

In general, child holding devices (such as strollers, bicycle trailers, high chairs, and child seats for attachment to motor vehicle seats) often have mechanisms to enable them to perform certain actions. For example, in the case of strollers, actuators can be used to release various adjustment mechanisms. Here, an actuation, usually pressing, of an actuating element releases, for example, the folding operation of the stroller. The actuating elements are often mounted in positions that are easy for the user to reach and that make sense for the action to be performed in each case. The attachment of the actuating element, for example, for initiating a folding process of a stroller, is particularly useful at the pusher of the stroller, since the user grips this pusher when pushing the stroller so that it is at a user-friendly height.

Furthermore, it is also necessary that the actuating elements are mounted at positions where an operative connection to a locking mechanism can be established. A stroller is often folded on an axis that is (as far as possible) central. The locking mechanism, which must be released in order to release the folding process of the stroller, is then often also located on this axis. The actuating element then interacts with the locking mechanism via an operative connection. This operative connection can be established via force transmission means, in particular cables, usually Bowden cables.

Such Bowden cables often run within a frame from the actuating element in opposite directions to locking devices (located at both ends of a folding axis). By pulling on the two Bowden cables, the locking mechanism can be released on both sides of the folding axis. The locking mechanism is often constructed in such a way that latching elements, for example gear teeth, pins or latches, cooperate with a counterpart on both sides of the folding axle, so that a certain state of the stroller (in particular a state of use in which the stroller can be pushed with the child picked up) is locked. When these locking elements are released, the folding operation is released. It is often necessary for these latching elements to be released synchronously, if possible at the same time, to enable the folding process and to prevent the latching elements from getting caught. For this reason, two Bowden cables are used.

Mechanisms are known from US 102 79 832 B2, JP 2007 076 538 A, DE 20 2019 10 3251 U1, FR 2 810 954 A1, CN 203186387 U and U.S. Pat. No. 20,180,265 114 A1 in which an actuating element is attached to the slide of a baby carriage. This interacts with two Bowden cables running in opposite directions from the actuating element and pulls on them when actuated. The Bowden cables run in the frame of the stroller to adjustment mechanisms which serve to trigger, for example, the braking process or the folding process.

KR 102 000 636 B1 shows how a locking mechanism can be designed for the folding process. In this case, gearwheels mesh at both ends of the axle in the locked state and are released from each other during the folding process by the actuating element on the slide and the two Bowden cables connected to it.

DE 20 2011 102 143 U1 also shows a mechanism for triggering the folding process. Two Bowden cables run from the actuating element on the pusher in opposite directions to the folding axle of the stroller. When the actuating element is pressed, the locking mechanism at both ends of the axle is released by the two Bowden cables, thus releasing the folding process.

Overall, the solutions in the prior art are considered comparatively error-prone.

It is the task of the invention to propose a child holding device, in particular a stroller and/or child seat, wherein a locking of a state of the child holding device is to be as simply and reliably feasible as possible.

This task is solved in particular by the object according to claim 1.

In particular, the task is solved by a child holding device (such as a push stroller and/or bicycle trailer and/or a child seat, such as a child seat for attachment to a motor vehicle seat and/or a child seat for stationary reception of the child, such as a high chair), comprising an adjusting device for adjusting a state of the child holding device, a locking mechanism comprising a first and at least one second locking device for locking said state, and an actuating device, in particular a manual actuating device, for actuating both said first locking device and said at least one second locking device.

A fundamental idea of the invention is to actuate both the first locking device and the at least one second locking device via a (common) actuating device. Preferably, the actuating device is connected to both the first locking device and the at least one second locking device via at least one (common or the same) force transmitting device. Thus, another particularly preferred idea of the invention is to use the same (common) force transmission means (such as in particular a common cable, preferably a common Bowden cable) to move both the first and the second locking device (i.e. in particular in the direction of a locking state or in the direction of an unlocking state or in both directions).

One advantage of the invention is that (starting from the actuating device) only one force transmission means (e.g. Bowden cable) is required, at least in sections, to produce and/or release a lock (e.g. at the two ends of a frame component). This means that malfunctions can be avoided and costs can be saved.

Preferably, the child holding device is a (conventional) stroller for pushing and/or a stroller that is used for exercising sporting activities, such as jogging. Furthermore, the child holding device may be a bicycle trailer. Alternatively (or additionally), it is conceivable that the child holding device is a child seat that is used, for example, for transporting a child in a vehicle.

A particularly preferred idea of the invention is to propose a locking mechanism comprising two (for example on two opposite sides of the child holding device) locking devices, wherein (only) one force transmission means (at least in sections) is required (or provided) for releasing and/or adjusting the corresponding locking device.

A force transmission means is to be understood in particular as a device which serves to transmit (indirectly or directly) a force exerted on the actuating device (for example by a hand and/or foot of the user) to the (several, in particular both) locking devices (e.g. on both sides of a connecting element).

The force transmission means preferably comprises a tension transmission device, in particular a cable, preferably a Bowden cable. The force transmission means can be connected (indirectly or directly) to the actuating device, for example at a first end.

The actuating device can be designed as a pressure element, flap element, rotary element, lever or sliding element. By actuating the actuating device, a force applied by the user can be transmitted via the force transmission means (for example directly to the first and/or second locking device or to a connecting element to which the force transmission means is connected, for example at its second end).

A force transmission means is to be understood in particular as a (common) force transmission means if a force flow (or a movement of the force transmission means) for setting and/or releasing the locking by the locking devices is synchronous (or identical) at least in sections. The force transmission means is preferably one-piece, possibly monolithic. Two functionally separate force transmission means (such as two separate Bowden cables) are preferably not to be understood as one (common) force transmission means. As far as a force flow branches (at least if it does not reunite), a section after the branching shall in particular not be understood as part of the (common) force transmission means. In this respect, the force transmission means can also be a component (section) of a superordinate device, whereby a section of this superordinate device in which there is a common force flow for driving both locking devices is to be understood in particular as a (common) force transmission means. A common force flow is also to be understood, if applicable, as a force flow that branches out in sections (for example, if openings are provided in the force-transmitting direction or two or more cables run in parallel), as long as the force flow reunites (or, if applicable, finally branches out). In this respect, it would also be conceivable that the (common) force transmission means has two (or more) cables running in parallel in sections, which however then both (or each for itself) (co-)effect a force transmission to the several (the two) locking devices.

The (common) force transmission means preferably has a length (in the case of dimensionally unstable or flexible solutions in a stretched state) of at least 5 cm, preferably at least 10 cm, optionally at least 20 cm or at least 35 cm and/or at most 200 cm or at most 100 cm.

The (common) force transmission means preferably has—at least in sections along its length—a thickness (diameter) of at least 0.1 mm, preferably at least 0.3 mm, optionally at least 0.5 mm and/or at most 1.0 cm or at most 3 mm.

The force transmission means can have at least one (preferably exactly one) tension transmission device and/or at least one (preferably exactly one) thrust transmission device. If necessary, the force transmission means can be designed as a force transmission means which is designed both for tension transmission and for thrust transmission. Particularly preferably, however, the force transmission means is designed as a (possibly pure) tension transmission device, with resetting preferably being effected by a pretensioning device (e.g. spring) or a further (possibly active) force transmission means.

The (common) tension transmission means and/or the (common) thrust transmission means are preferably configured to displace (or at least to co-activate such a displacement of) both the first and the at least second locking device.

In specific embodiments, the force transmission means can be designed to be flexible and/or dimensionally unstable, at least in sections (possibly completely). A flexible design means in particular that the force transmission means (at least in the corresponding section) yields (bends, for example) when the actuating device is actuated, but may independently return to its original shape and/or position.

The force transmission means can be dimensionally unstable in the sense that it can be placed (in isolation) in any configuration (such as a string).

The force-transmitting device can also be dimensionally stable (but possibly flexible at the same time) in the sense that, although it changes shape when force is applied (for example, it bends), it returns to a predetermined shape (such as a plastic ruler) when an external force is not applied.

In particular, the force transmission means shall be considered flexible if it is possible (when the force transmission means is considered in isolation) by means of a force of less than 20 Newtons, possibly less than 10 Newtons, to displace at least two points of the force transmission means (for example two end points) by at least 5 mm, preferably at least 2 cm, relative to each other (so that the second point displaces by at least 5 mm or at least 2 m, respectively, if the first point is considered to be stationary or the origin of a Cartesian coordinate system, respectively).

In particularly preferred embodiments, the force transmission means comprises (or is formed from) a cable, in particular a Bowden cable.

Preferably, the force transmission means is (indirectly or directly) connected to at least one (preferably exactly one) rotatably mounted rotary element (and preferably at an end of the force transmission means remote from or facing away from the actuating device).

A first end of the rotary element is preferably connected to the first locking device. Alternatively or additionally, a second end of the rotary element is preferably connected to the at least one second locking device.

The rotating element is preferably supported via a first and/or second and/or third axis of rotation.

The first axis of rotation is preferably stationary relative to a complementary structure (e.g. latch receiver) of the child holding device for locking by the first and/or second locking device. The second axis of rotation is preferably stationary relative to the first locking device. The third axis of rotation is preferably stationary relative to the second locking device. The respective (first and/or second and/or third) axis of rotation may be arranged on the rotary element itself or on the complementary device. For example, the axis of rotation may be formed as a pin or rod. The bearing arrangement can be implemented with or without relative translational freedom of movement (or with or without play). For example, the bearing can be realized via the first rotational axis without relative translational freedom of movement (or without play) and the bearing via the second and third rotational axes with relative translational freedom of movement (or with play), in particular to enable (simultaneous) rotation about all three axes. The (respective) relative translational freedom of movement (or play) can be at least 1 mm, preferably at least 3 mm and/or at most 5 cm, preferably at most 1 cm, possibly at most 0.5 cm.

In embodiments, the first and/or second and/or third axis of rotation are not provided on the rotary element. The rotary element may have one or more recess(es) (e.g., holes, in particular through-holes) that provide bearing support on the corresponding axis of rotation. Specifically, the rotating element may have a first recess that is supported on the first axis of rotation. This first recess may be circular, for example. Furthermore, a second recess of the rotating element may be supported on the second axis of rotation. This second recess is preferably slot-like, so that the complementary second rotation axis is displaceable within this elongated hole (at least a small distance). Furthermore, a third recess of the rotary element can be mounted on the third rotary axis. This third recess is preferably slot-like, so that the complementary third axis of rotation is displaceable within this slot (at least a small distance).

In alternative embodiments, the first and/or second and/or third axis of rotation are provided on the rotary element. The rotary element may then have one or more projections (e.g., rods, pins) that form a respective axis of rotation. Specifically, a complementary structure may include a first recess in which the first axis of rotation is supported. This first recess may be circular, for example.

Furthermore, the second axis of rotation may be supported in a second recess provided on the first locking device. This second recess is preferably slot-like, so that the complementary second axis of rotation is displaceable within this elongated hole (at least a small distance). Furthermore, the third axis of rotation can be mounted in a third recess provided on the first locking device. This third recess is preferably slot-like, so that the complementary second axis of rotation is displaceable within this slot (at least a small distance).

Combinations of the two preceding paragraphs are possible, for example, a first rotational axis provided on the rotating member and second and third rotational axes not provided on the rotating member (but on the first and second locking devices, respectively).

The rotary axes and/or through holes may be arranged on a line. The first axis of rotation is preferably located (at least approximately) in a center of the rotary element (i.e., at least in a middle third of the rotary element, optionally exactly in the center, relative to an extension in the longitudinal direction and/or a direction defined by a connecting line between the first axis of rotation and the second axis of rotation and/or the first axis of rotation and the third axis of rotation).

The rotating element is preferably rigid.

The first and/or at least one second locking device can be translationally and/or rotationally movable (purely translationally or purely rotationally or both translationally and rotationally). Furthermore, the first and/or at least one second locking device may comprise at least one locking projection which may optionally cooperate with a complementary recess, e.g. on a main body of the child holding device (or alternatively a recess which may optionally cooperate with a complementary locking projection, e.g. on the main body of the child holding device).

The first and/or at least one second locking device may be biased by at least one biasing device, preferably comprising at least one spring, preferably such that the biasing device urges the respective locking device into locking position (or alternatively into unlocking position).

The first and at least one second locking device are preferably movable in opposite directions and/or in a lateral direction (with respect to the child holding device).

The first and/or at least one second locking device can be movable in a direction that is perpendicular to a viewing direction of the child and/or perpendicular to a direction of movement of a child holding device designed as a stroller (for straight exit).

Insofar as reference is made above and below to directions of movement of the respective locking device, this is intended to mean in particular, in the case of solutions which are not purely translational, that that structure (e.g. a locking projection) of the locking device which is ultimately brought into engagement with the complementary structure of the child holding device moves in that direction when the locking structure is at an infinitesimal distance from a final position (in the locking state).

In embodiments, at least a first section of the force transmission means movable relative to the first and/or at least one second locking device, in particular a section adjacent to the rotary element, is movable in a direction which has an angle of less than 90°, preferably less than 60°, further preferably less than 30°, relative to a straight line (defined by the movement of the first and/or at least one second locking device and/or defined by a connecting line between the first and/or at least one second locking device). Particularly preferably, the first section of the force transmission means is movable at least substantially parallel to the straight line.

In embodiments, at least a second section of the force transmission means movable relative to the first and/or at least one second locking device (in particular a section not adjacent to the rotary element and/or a section adjacent to the actuating device) and/or the actuating device can be movable in a direction which has an angle of greater than 0°, preferably greater than 30°, possibly greater than 60°, e.g. at least approximately 90°, relative to a straight line defined by the movement of the first and/or at least one second locking device and/or defined by a connecting line between the first and/or at least one second locking device. greater than 60°, e.g. at least approximately 90°.

In a specific embodiment, a lock can be released by the first and/or at least one second locking device by pulling, preferably via a Bowden cable.

At least one guiding means (at least one guide element) can guide at least one of the locking devices (latches) of the locking mechanism (possibly also all or both locking devices). The guiding means can be designed as an (elongated) hollow chamber or rail.

The guiding means can have first guiding means for guiding the first locking device and second guiding means for guiding the second locking device. The first and second guiding means can be formed by a common guide element or by separate guide elements.

The force transmission means (the force transmission element) can be connected to a connecting device (connecting element) in such a way that a transmitting tensile force acts on the connecting device (the connecting element) at an angle of at most 45°, preferably at most 20° (in particular at least substantially 0°) with respect to an extension device defined by an extension of at least one guiding means (a guide element).

Preferably, both locking devices (both latches) are moved in opposite directions (in particular when the locking mechanism is transferred from a locking to a non-locking position and/or vice versa by actuating the actuating device or actuating element).

Particularly preferably, the force transmission means (the force transmission element) is connected to a/the connecting device (connecting element) in such a way that a transmitting force acts on the connecting device (the connecting element) at an angle of less than 45°, preferably less than 20°

(particularly preferably at least substantially 0°) with respect to a straight line defined by an axis or direction of movement of at least one locking latch (in particular of the two locking latches).

The connecting device (the connecting element) can cooperate with a third guiding means (guide element) in such a way that it is guided by (this). In particular, the third guiding means is designed in such a way that a movement of the connecting device (the connecting element) in the direction of movement of the locking latches is enabled, but a movement perpendicular thereto is not.

The movement of the connecting device (the connecting element) can be restricted to a specific range. For this purpose, for example, the third guiding means (guide element) can have at least one stop (in particular two end stops) which restricts a movement of the connecting device (the connecting element) to a specific range. This range can be designed in such a way that the connecting device (the connecting element) terminates at one end of the third guiding means (guide element) in a rest position (when no force is exerted), and terminates at the other end of the third guiding means (guide element) when a force is exerted on the force transmission means (the force transmission means or force transmission element), i.e. in its functional position.

The connecting device can cooperate with or be correspondingly connected to a first drive device (first drive element) and/or a first end of the rotary element (rotary joint). The rotary element (rotary joint) can be connected at its second end to a second drive device (second drive element). The drive devices (drive elements) may be designed to cooperate with the connecting device (connecting element) when force is applied in such a way that they are transferred from a rest position to a (non-locking) functional position. When transferring the drive devices (drive elements) from the rest position to the functional position (or from the locking position to the non-locking position), the two drive devices (drive elements) can be moved in opposite directions (towards each other).

The drive devices (drive elements) are preferably designed such that they each have a locking element or latch (e.g. locking projection or locking recess) at their outer ends. Preferably, the first locking device is configured to include a first latch that is movable between a locking position to a non-locking position in a first direction. The second locking device may have a second latch that is movable between a locking position to a non-locking position in a second direction, in particular opposite to the first direction.

The rotating element (swivel joint) is preferably designed to cooperate with the connecting device (connecting element) so that both drive devices (drive elements) or both latches are transferred from the locking to the non-locking position when force is applied.

The connecting device (or connecting element) and (first) drive device (or drive element) can be designed as one component. Preferably, however, they are designed as separate components which are connected to each other (if necessary, firmly, releasably or non-releasably), for example screwed together.

The rotary element (rotary joint) can be supported at its first end by a first guide structure (e.g. guide slot) in/on the connecting device (connecting element) in such a way that rotation of the rotary element relative to the connecting device (connecting element) is permitted. In particular, the guide structure can be designed as a link, so that a rotation and/or a movement of a first bearing device (bearing element) assigned to the connecting device is permitted along the first guide structure (e.g. guide slot).

At its second end, the rotary element (rotary joint) can be mounted in/on the second drive device (the second drive element) via a second guide structure (e.g. a second guide slot), so that rotation of the rotary element (rotary joint) about the second drive device (the second drive element) is permitted. In particular, the second guide structure (the second guide slot) can be designed as a link, so that a rotation and/or a movement of a second bearing device (bearing element) (facing the second drive device) along the second guide structure (e.g. the second guide slot) is permitted.

Preferably, first and second guide structures (or first and second guide slots) extend in the same direction, in particular radially with respect to a pivot point of the rotating element.

In a central area, in particular at the midpoint, between the two guide structures (guide slots), the rotary element (rotary joint) can be rotatably mounted on one of the guiding means (guide elements) or on another component (stationary with respect to a respective mating structure for receiving the first and/or second locking device) of the child holding device and rotate about this pivot point.

The first and second drive devices (or the first and second drive elements) can be guided by the first and second guiding means (the first and second guide elements). The first guiding means (the first guide element) is preferably designed to allow movement of the first drive device in the direction of movement of the first latch, but preferably not to allow movement perpendicular thereto. The second guiding means (the second guide element) is preferably designed to permit movement of the second drive device in the direction of movement of the second latch, but preferably not movement perpendicular thereto.

A movement of the first and/or second drive device can be restricted to a specific range. Preferably, the respective guiding means (the first guide element) has at least one stopping element that restricts a (e.g. horizontal) movement of the connecting device to a specific range.

The first, second and third guiding means can also be designed together, i.e. designed as a common guiding means (guiding element).

The drive devices (drive elements) can interact with the respective guiding means in such a way that they remain in the corresponding (e.g. locking) position when the actuating device (actuating element) is not actuated. In particular, the drive devices can be spring-mounted on the respective guiding means (guide element) in such a way that they remain in the corresponding (e.g. locking) position.

For this purpose, for example, at least one bearing block can be provided on (or stationary opposite) the first guiding means. Furthermore, a first recess can be provided for this purpose in the first drive device (the first drive element), in which a first elastic means (pretensioning device), in particular a spring, is mounted and is not force-loaded in the (non-loaded) rest position of the first drive device (the first drive element). In the (loaded) functional position of the first drive device (of the first drive element), the elastic means can exert a restoring force on the second drive device (the second drive element) in the direction of the rest position. Preferably, a second bearing block is associated with the second guiding means, which cooperates with the second drive device (the second drive element) in an analogous manner.

According to an embodiment, another return mechanism may be used instead of the above return mechanism, for example comprising a rotary spring (torsion spring) acting on the rotary element (the rotary joint).

According to the embodiment, the first drive device (the first drive element) and the first latch can also be formed in one piece (possibly monolithically) and/or the second drive device (the second drive element) and the second latch.

A one-piece (possibly monolithic) design of the first latch, first drive device (first drive element) and connecting device (connecting element) is also possible.

A rotational movement of the latches with respect to the drive device (the drive element) during transfer from the locking to the non-locking position is also possible.

The described mechanism is suitable, for example, for locking the use position and/or storage position of a foldable stroller frame. It is also suitable for locking different height settings (to shift a center of gravity) of a stroller frame (for example, to convert a jogger trailer with a high center of gravity into a bicycle trailer with a low center of gravity). It is also suitable for locking the length settings of the Isofix arms of a child seat or a base for a child seat.

The above task is further solved by a method for configuring a child holding device, preferably as described above, in particular a stroller and/or child seat, wherein the child holding device comprises:

An adjusting device for adjusting a state of the child holding device, a locking mechanism comprising a first and at least one second locking device for locking the state, as well as an, in particular manual, actuating device (10) for actuating both the first locking device and the at least one second locking device, wherein the actuating device (10) is connected to both the first and the at least one second locking device via at least one common force transmitting device (21), wherein the actuating device is actuated for actuating both the first locking device and the at least one second locking device, wherein the actuating device is connected to both the first locking device and the at least one second locking device via at least one common force transmitting device. Further embodiments of the method result from the appended claims and/or the above and/or following description of the child holding device, wherein purpose details and/or functional features can be carried out as specific method steps.

Further embodiments result from the dependent claims.

Figure 2:
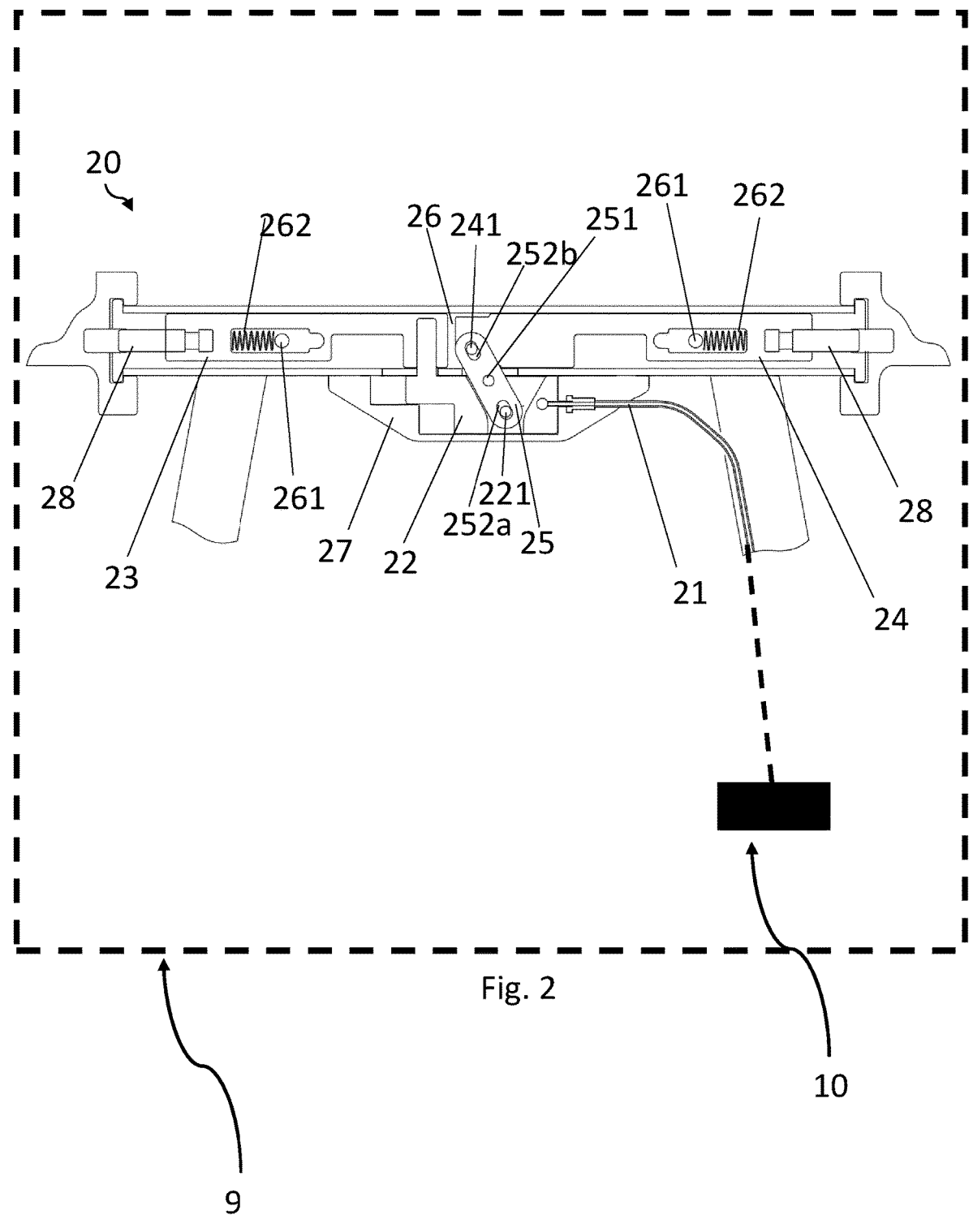

The invention is described below on the basis of an embodiment example, which is explained in more detail with reference to the Figures. These show:

FIG. 1a schematic (partly highly schematic) representation of a child holding device according to the invention in a first state; and FIG. 2 the child holding device according to FIG. 1 in a second state.

In the following description, the same reference numbers are used for identical parts and parts with the same effect.

FIG. 1 shows a child holding device 9 with an actuating device 10 (shown only schematically) for actuating a locking mechanism. The locking mechanism in FIG. 1 is in the locked state. A force transmission means 21 is connected at one end to a connecting device (connecting element) 22. The connecting device 22 is in (direct) connection with a first drive device (a first drive element) 23 or is fixedly connected to the first drive device 23.

The first 23 and a second 24 drive device are guided in a common guiding means (common guide element) 26, which can be subdivided into a first guiding means 26a for the first drive device 23 and a second guiding means 26b for the second drive device 24. First guiding means 26a and second guiding means 26b can also (not shown) be designed as separate elements, i.e. a first guide element and a second guide element.

The connecting device 22 is connected to a first end of a rotating element (pivot joint) 25 by a first bearing device (bearing element) 221 and a first recess (guide structure or guide slot) 252a. The recess 252a allows movement of the first bearing device 221 within the recess 252a.

The rotating element (swivel joint) 25 is rotatably mounted in a stationary manner relative to a second guiding means at a pivot point 251 and can rotate about the latter.

Another end of the rotary element 25 is connected to a second drive device (drive element) 24 by a second bearing device (bearing element) 241 and another recess (guide structure or guide slot) 252b. Also, the second recess 252b allows movement of the bearing means 221 within second recess 252b.

The first drive device 23 and the second drive device 24 are (fixedly) connected by latches 28. By means of a resilient means 262, which is mounted on a bearing block 261, the mechanism can be held in the locked state. The first drive device 23 and the second drive device 24 and their latches 28 are pressed into locking position by a spring force.

FIG. 2 shows the locking mechanism in the non-locking state. By pulling a force transmission means 21 and thus a connecting device 22, against the spring force of the elastic means 262, the rotating element 25 rotates about the pivot point 251 and thereby pulls on the second drive device 24. The first drive device 23 is in (direct) connection with the connecting device 22. As a result, the first drive device 23 and the second drive device 24 are pulled towards the center and thus the latches 28 are released.

At this point it should be pointed out that all the parts described above, taken individually and in any combination, in particular the details shown in the drawings, are claimed to be essential to the invention. Modifications thereof are familiar to those skilled in the art.

REFERENCE SIGN

9 Children holding device
10 Actuating device
20 Locking mechanism
21 Force transmitting device
22 Connection device (connecting element)
221 first bearing device (first bearing element)
23 First drive device (first drive element)
24 Second drive device (second drive element)
241 Second bearing device (second bearing element)
25 Rotating element (swivel joint)
251 Pivot point
252a Recess (guide structure or guide slot)
252b Recess (guide structure or guide slot)
26 Common guiding means (common guiding element)
26 First guiding means
26 Second guiding means
261 Bearing block
262 Elastic means
27 third guiding means (second guiding element)
28 Latch

The invention claimed is:

1. A child holding device comprising a push stroller, a child seat, or a combination thereof, comprising:
   a locking mechanism comprising a first locking device and at least one second locking device for locking a state of the child holding device,
   a manual actuating device for actuating the first locking device and the at least one second locking device,
   at least one common force transmission device, and at least one rotatably mounted rotary element, wherein the at least one common force transmission device is connected to the at least one rotatably mounted rotary element, wherein the manual actuating device is connected to the first locking device and the at least one second locking device via the at least one common force transmission device, and wherein at least a first section of the at least one common force transmission device is movable relative to the first locking device or the at least one second locking device in a direction which has an angle of less than 30° relative to a straight line defined by a connecting line extending between the first locking device and the at least one second locking device.

2. The child holding device according to claim 1, wherein the at least one common force transmission device has at least one tension transmission device or at least one thrust transmission device, and wherein the at least one common force transmission device is configured to at least assist in displacing the first locking device and the at least one second locking device.

3. The child holding device according to claim 1, wherein a first end of the rotary element is connected to the first locking device and a second end of the rotary element is connected to the at least one second locking device.

4. The child holding device according to claim 1, wherein the first locking device or the at least one second locking device:

is translationally movable;

and has at least one locking projection.

5. The child holding device according to claim 1, wherein at least the first section of the at least one common force transmission device is movable relative to the first locking device or the at least one second locking device in a direction which, with respect to a straight line defined by movement of the first locking device or the at least one second locking device has an angle of less than 90°.

6. The child holding device according to claim 1, wherein at least a second section of the at least one common force transmission device is movable relative to the first locking device or the at least one second locking device or the actuating device in a direction which, with respect to a straight line defined by movement of the first locking device or the at least one second locking device has an angle of greater than 0°.

7. The child holding device according to claim 1, wherein a locking by the first locking device or the at least one second locking device can be released by pulling the at least one common force transmission device which comprises a Bowden cable.

8. The child holding device according to claim 1, wherein the at least one common force transmission device is configured to be flexible.

9. The child holding device of claim 1, wherein the rotary element is mounted by means of a first axis of rotation which is stationary relative to a mating structure and which is by the first locking device or the at least one second locking device, and wherein the rotary element is mounted by a second axis of rotation, which is stationary relative to the first locking device, and wherein the rotary element is supported by a third rotary axis, which is stationary relative to the at least one second locking device.

10. The child holding device of claim 1, wherein the first locking device or the at least one second locking device is biased by at least one biasing device comprising at least one spring in such a way that the at least one biasing device forces the first locking device or the at least one second locking device into a locking position, and wherein the first locking device and the at least one second locking device are movable in opposite directions.

11. A method of adjusting the child holding device according to claim 1, comprising actuating the manual actuating device:

to actuate the first locking device and the at least one second locking device.

12. The method according to claim 11, wherein at least a second section of the at least one common force transmission device is movable relative to the first locking device or the at least one second locking device, or the actuating device is moved in a direction which, with respect to a straight line defined by movement of the first locking device or the at least one second locking device is at an angle of greater than 0°.

13. The method according to claim 11, wherein a locking by the first locking device or the at least one second locking device is released by pulling the at least one common force transmission device which comprises a Bowden cable.

14. The method according to claim 11, wherein the at least one common force transmission device has at least one tension transmission device or at least one thrust transmission device, the at least one common force transmission device assisting a displacement of the first locking device and the at least one second locking device.

15. The method according to claim 11, wherein the first locking device or the at least one second locking device is actuated by moving translationally, and wherein one of the first locking device or the at least one second locking device has at least one locking projection.

16. The method according to claim 11, wherein at least the first section of the at least one common force transmission device is movable in a direction which, with respect to a straight line defined by movement of the first locking device or the at least one second locking device, has an angle of less than 90°.

17. The method according to claim 11, wherein the first locking device or the at least one second locking device includes biasing from at least one biasing device comprising at least one spring in such a way that the at least one biasing device forces the first locking device or the at least one second locking device into a locking position, wherein the first locking device and the at least one second locking device are moved in opposite directions.

* * * * *